United States Patent
Chen et al.

(10) Patent No.: US 12,299,374 B2
(45) Date of Patent: May 13, 2025

(54) SYSTEM AND METHOD FOR FABRICATING A SEMICONDUCTOR DEVICE

(71) Applicant: Taiwan Semiconductor Manufacturing Company, Ltd., Hsinchu (TW)

(72) Inventors: Tai-Yi Chen, Hsinchu (TW); Yung-Shun Chen, Taoyuan (TW); Tse-Hung Chen, Taipei (TW); Chih-Chiang Chang, Taipei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 570 days.

(21) Appl. No.: 17/690,058

(22) Filed: Mar. 9, 2022

(65) Prior Publication Data
US 2023/0161942 A1 May 25, 2023

Related U.S. Application Data

(60) Provisional application No. 63/282,268, filed on Nov. 23, 2021.

(51) Int. Cl.
*G06F 30/398* (2020.01)
*G06F 30/20* (2020.01)
(Continued)

(52) U.S. Cl.
CPC ............ *G06F 30/398* (2020.01); *G06F 30/20* (2020.01); *G06F 30/323* (2020.01);
(Continued)

(58) Field of Classification Search
CPC .... G06F 30/398; G06F 30/20; G06F 30/3308; G06F 30/323; G06F 30/327; G06F 30/367; G06F 2119/10
(Continued)

(56) References Cited

U.S. PATENT DOCUMENTS 5,715,170 A * 2/1998 Nakamori ............... G06F 30/33
703/19
8,386,978 B1 * 2/2013 Song .................... G06F 30/3312
716/108
(Continued)

FOREIGN PATENT DOCUMENTS

CN       103793548 A  *  5/2014  ......... G06F 17/5036

*Primary Examiner* — Phallaka Kik
(74) *Attorney, Agent, or Firm* — Jones Day

(57) ABSTRACT

A system for fabricating a semiconductor device includes one or more data processors configured to perform operations commanded by instructions stored in a non-transitory computer-readable medium. The instructions include receiving a layout including a plurality of elements, extracting parasitic values associated with the layout to generate a resistance and capacitance (RC) netlist, generating a modified RC netlist by adding element names of the elements of the layout to the RC netlist, performing a post-layout simulation on the modified RC netlist to determine whether the layout meets a predetermined specification, and fabricating a semiconductor device based on the layout when it is
(Continued)

130

Add element names to the extracted parasitic values table of the RC netlist to generate a first modified RC netlist ~510

Decouple the element names from each other and parameterize the decoupled element names to generate a plurality of second modified RC netlists ~520

Perform post-layout simulations on the first modified RC netlist and the second modified RC netlists ~530

Establish a relationship among the element names, the weighted parasitic resistances, and the performances of semiconductor device ~540 determined that the layout meets the predetermined specification. The RC netlist includes the extracted parasitic values. The modified RC netlist includes a netlist table storing the element names and the extracted parasitic values.

20 Claims, 16 Drawing Sheets

(51) Int. Cl.
    *G06F 30/323*      (2020.01)
    *G06F 30/327*      (2020.01)
    *G06F 30/3308*     (2020.01)
    *G06F 30/367*      (2020.01)
    *G06F 119/10*      (2020.01)

(52) U.S. Cl.
    CPC ........ *G06F 30/327* (2020.01); *G06F 30/3308* (2020.01); *G06F 30/367* (2020.01); *G06F 2119/10* (2020.01)

(58) Field of Classification Search
    USPC ................ 716/115, 111, 106, 103, 104, 136; 703/14, 15
    See application file for complete search history.

(56) References Cited

U.S. PATENT DOCUMENTS

| | | | |
|---|---|---|---|
| 8,407,646 B2* | 3/2013 | Chandramohan | G06F 30/367 716/122 |
| 8,826,213 B1* | 9/2014 | Ho | G06F 30/367 716/136 |
| 9,223,912 B1* | 12/2015 | Liapis | G06F 30/398 |
| 2006/0150132 A1* | 7/2006 | Gupta | G03F 7/70433 716/51 |
| 2013/0326447 A1* | 12/2013 | Huang | G06F 30/398 716/112 |
| 2015/0100938 A1* | 4/2015 | Lu | G06F 30/394 716/131 |
| 2015/0254392 A1* | 9/2015 | Onodera | G06F 30/398 716/114 |
| 2016/0125115 A1* | 5/2016 | Strang | G06F 30/30 716/116 |
| 2016/0140273 A1* | 5/2016 | Alfano | G06F 30/367 703/14 |
| 2022/0261526 A1* | 8/2022 | Zhu | G06F 30/398 |

\* cited by examiner extracted parasitic values

| codename#1 | codename#2 | codename#3 | codename#4 | extracted parasitic value |
|---|---|---|---|---|
| R1_1995 | VDD:41 | VDD:47 | $lvl1=1 | r1 |
| R1_1997 | VDD:40 | VDD:41 | $lvl2=2 | r2 |
| R1_1998 | VDD:39 | VDD:40 | $lvl3=3 | r3 |
| C2_5336 | VSS:94 | VDD:87 | $lvl4=4 | c1 |
| C2_5338 | VSS:01 | VDD:87 | $lvl5=5 | c2 |
| C72_19 | A<2>:12 | VDD:35 | $lvl6=6 | c3 |

Fig. 3 element names

| codename#5 | element name |
|---|---|
| *1 | M1_A |
| *2 | V1 |
| *3 | M2_Y |
| *4 | M1_A_M1_B |
| *5 | M2_X_M2_Y |
| *6 | M1_A_M2_Y |

Fig. 4 first modified RC netlist

| codename#6 | codename#7 | codename#8 | codename#9 | extracted parasitic value | weighing factor (W) | element name |
|---|---|---|---|---|---|---|
| R1_1995 | VDD:41 | VDD:47 | $lvl1=1 | r1 | 1 | M1_A |
| R1_1997 | VDD:40 | VDD:41 | $lvl2=2 | r2 | 1 | V1 |
| R1_1998 | VDD:39 | VDD:40 | $lvl3=3 | r3 | 1 | M2_Y |

600

Fig. 6 second modified RC netlist

| extracted parasitic value | weighing factor (W) | element name |
|---|---|---|
| r1 | 0.8 | M1_A |
| r2 | 1 | V1 |
| r3 | 1 | M2_Y |

Fig. 8A second modified RC netlist

| extracted parasitic value | weighing factor (W) | element name |
|---|---|---|
| r1 | 0.9 | M1_A |
| r2 | 1 | V1 |
| r3 | 1 | M2_Y |

Fig. 8B second modified RC netlist

| extracted parasitic value | weighing factor (W) | element name |
|---|---|---|
| r1 | 1.1 | M1_A |
| r2 | 1 | V1 |
| r3 | 1 | M2_Y |

Fig. 8C second modified RC netlist

| extracted parasitic value | weighing factor (W) | element name |
|---|---|---|
| r1 | 1.2 | M1_A |
| r2 | 1 | V1 |
| r3 | 1 | M2_Y |

| weighted parasitic capacitance | performance | | |
|---|---|---|---|
| | M1_A | V1 | M2_Y |
| 0.8x | +1.5% | +1.2% | +0.02% |
| 0.9x | +0.8% | +0.7% | +0.01% |
| 1x | 0% | 0% | 0% |
| 1.1x | -0.5% | -0.4% | -0.01% |
| 1.2x | -1.0% | -0.9% | -0.02% |

Fig. 9 first modified RC netlist

| codename#5 | codename#6 | codename#7 | codename#8 | extracted parasitic value | weighing factor (W) | element name |
|---|---|---|---|---|---|---|
| C2_5336 | VSS:94 | VDD:87 | $lv14=4 | c1 | 1 | M1_A_M1_B |
| C2_5338 | VSS:01 | VDD:87 | $lv15=5 | c2 | 1 | M2_X_M2_Y |
| C2_19 | A<2>:12 | VDD:35 | $lv16=6 | c3 | 1 | M1_A_M2_Y |

Fig. 14A second modified RC netlist

| extracted parasitic value | weighing factor (W) | element name |
|---|---|---|
| c1 | 0.8 | M1_A_M1_B |
| c2 | 1 | M2_X_M2_Y |
| c3 | 1 | M1_A_M2_Y |

Fig. 14B second modified RC netlist

| extracted parasitic value | weighing factor (W) | element name |
|---|---|---|
| c1 | 0.9 | M1_A_M1_B |
| c2 | 1 | M2_X_M2_Y |
| c3 | 1 | M1_A_M2_Y |

Fig. 14C second modified RC netlist

| extracted parasitic value | weighing factor (W) | element name |
|---|---|---|
| c1 | 1.1 | M1_A_M1_B |
| c2 | 1 | M2_X_M2_Y |
| c3 | 1 | M1_A_M2_Y |

Fig. 14D second modified RC netlist

| extracted parasitic value | weighing factor (W) | element name |
|---|---|---|
| c1 | 1.2 | M1_A_M1_B |
| c2 | 1 | M2_X_M2_Y |
| c3 | 1 | M1_A_M2_Y |

1500

| weighted parasitic capacitance | M1_A_M1_B | M2_X_M2_Y | M1_A_M2_Y |
|---|---|---|---|
| | | performance | |
| 0.8x | +1.80% | +1.00% | -0.10% |
| 0.9x | +1.00% | +0.40% | -0.03% |
| 1x | 0% | 0% | 0% |
| 1.1x | -0.08% | -0.30% | +0.02% |
| 1.2x | +1.50% | -0.80% | +0.08% |

Fig. 15

SYSTEM AND METHOD FOR FABRICATING A SEMICONDUCTOR DEVICE

PRIORITY CLAIM

This application claims priority to U.S. Provisional Application No. 63/282,268, filed Nov. 23, 2021, the contents of which are incorporated herein by reference in its entirety.

BACKGROUND

The process of designing a semiconductor device typically involves use of a number of tools. Those tools can range from the experience of the designer to computer-software tools, such as electronic design automation (EDA) tools.

BRIEF DESCRIPTION OF THE DRAWINGS

Aspects of the present disclosure are best understood from the following detailed description when read with the accompanying figures:

FIG. 3 is a diagram illustrating an exemplary extracted parasitic values table of an RC netlist in accordance with various embodiments of the present disclosure;

FIG. 4 is a diagram illustrating an exemplary element names table of an RC netlist in accordance with various embodiments of the present disclosure;

FIG. 6 is a diagram illustrating an exemplary first modified RC netlist in accordance with various embodiments of the present disclosure;

FIGS. 8A-8D are diagrams illustrating exemplary second modified RC netlists in accordance with various embodiments of the present disclosure;

FIG. 9 is a diagram illustrating an exemplary performance table in accordance with various embodiments of the present disclosure;

FIG. 12 is diagram illustrating another exemplary first modified RC netlist in accordance with various embodiments of the present disclosure;

FIGS. 14A-14D are diagrams illustrating another exemplary second modified RC netlists in accordance with various embodiments of the present disclosure;

FIG. 15 is a diagram illustrating another exemplary performance table in accordance with various embodiments of the present disclosure;

DETAILED DESCRIPTION

Figure 1:
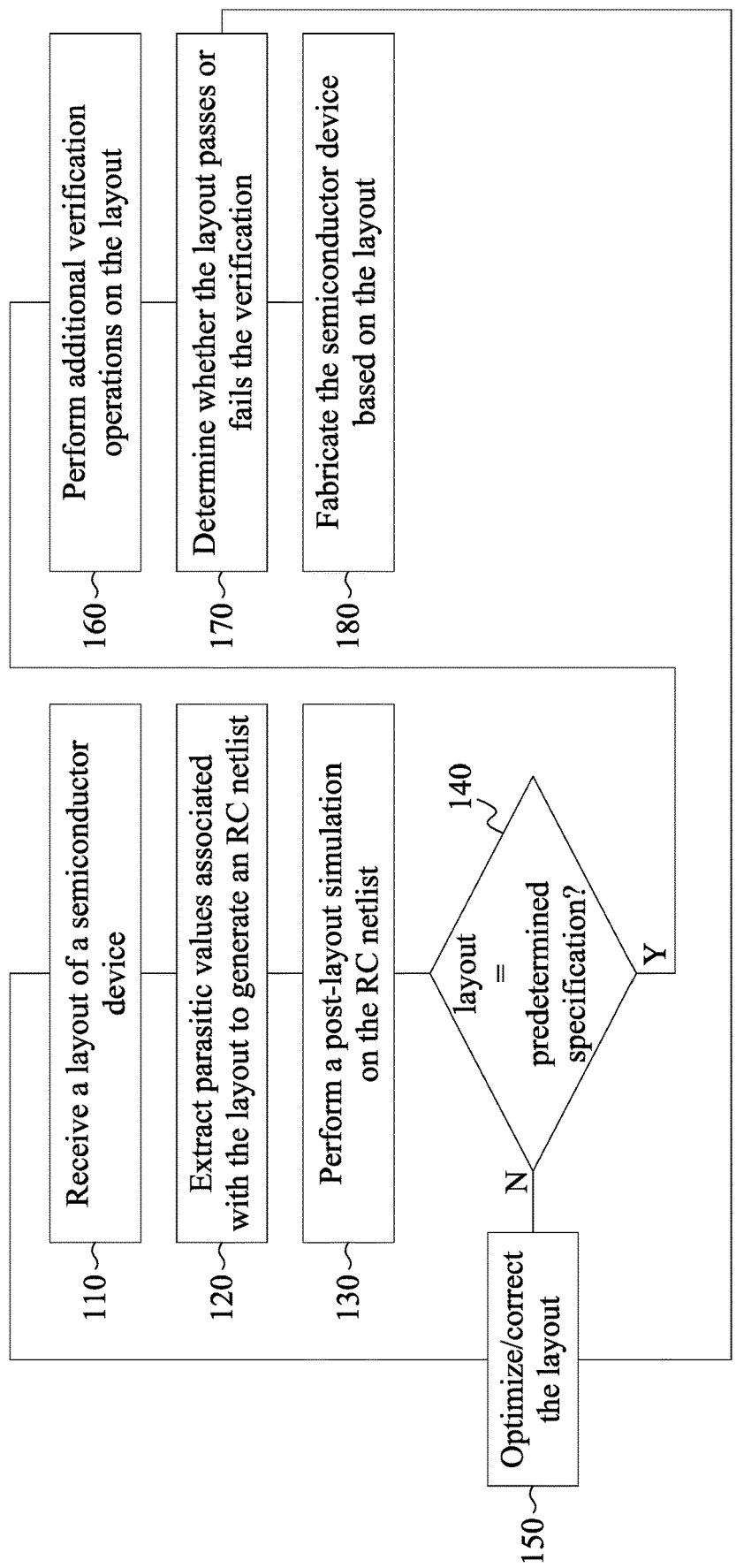
FIG. 1 is flow chart illustrating an exemplary method of fabricating a semiconductor device in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Design of semiconductor devices seeks to develop an optimum design for providing desired circuit functionality while meeting certain other design goals. For example, it may be desirable to develop a circuit that provides the desired functionality while also providing fast, power efficient operation. Realities of semiconductor implementations (e.g., circuit parasitics, fabrication imperfections) may result in a fabricated semiconductor device that differs from design ideals. The ability to consider these realities and to augment semiconductor design, at the design stage, based on these realities, can result in improved devices.

Systems and methods herein can, in embodiments, consider enhanced semiconductor fabrication and implementation realities during the design phase, resulting in improved semiconductor devices post-fabrication. In one example, after generating a layout of a semiconductor device and prior to manufacturing or fabrication of the semiconductor device, parasitic values, e.g., parasitic resistances and capacitances, associated with the layout are extracted. A post-layout simulation is performed on the layout in light of the extracted parasitic values to verify whether the semiconductor device achieves a performance as designed.

In designing a semiconductor device, a layout of the semiconductor device may be received. The layout includes elements such as electronic components and interconnects. A parasitic resistance and capacitance (RC) extraction may be performed so as to extract, e.g., from a technology file, parasitic values, e.g., parasitic capacitances and resistances, associated with the layout. An RC netlist may then be generated to include the extracted parasitic values. A post-layout simulation may be performed on the RC netlist to determine whether the layout meets a predetermined specification, taking into account the effect of the extracted parasitic values on the performance of the semiconductor device. If it is determined that the layout meets the predetermined specification, the semiconductor device design process may end. Otherwise, i.e., it may be determined that the extracted parasitic values are detrimental to the performance of the semiconductor device, and the layout is optimized through one or more iterations. Because the semiconductor device designer may not be able to identify from a post-layout simulation result of the post-layout simulation which elements of the layout have parasitic values detrimental to the performance of the semiconductor device, the layout optimization may take a relatively long period of time.

Systems and methods as describe herein facilitate shortening of an amount of time designing a semiconductor device. For example, in one or more embodiments, element names, e.g., element names (M1_A, M1_B, V1, M2_X, M2_Y), are added to an extracted parasitic values table of an RC netlist. Such element names are human readable, i.e., intelligible to the semiconductor device designer. That is, such element names are de-facto names given to the elements in the layout by the semiconductor device designer or by which the elements in the layout are identified, addressed, known, or referred to by the semiconductor device designer. For example, the semiconductor device designer understands that M1_A is a conductive line in an M1 layer and assigned to a first photomask, M1_B is a conductive line in the M1 layer and assigned to a second photomask, M2_X is a conductive line in an M2 layer above the M1 layer and assigned to a third photomask, V1 is via interconnecting the conductive lines (M1_A, M2_X), and M2_Y is a conductive line in the M2 layer and assigned to a fourth photomask.

A first modified RC netlist may then be generated that includes the element names and the extracted parasitic values. A plurality of second modified RC netlists may be generated based on the first modified RC netlist. As will be described below, the second modified RC netlists may decouple the element names of the first modified RC netlist from each the other and parameterizes the decoupled element names. Post-layout simulations may be performed on the first modified RC netlist and the second modified RC netlists to output a plurality of post-layout simulation results. Thereafter, a relationship among the element names, the weighted extracted parasitic values, and the performances of the semiconductor device may be established based on the post-layout simulation results. Such a relationship may be described in the form of a table or a graph. Such a performance table/graph allows the semiconductor device designer to conduct a sensitivity analysis on how sensitive the performance of the semiconductor device to the elements of the layout, thereby shortening an amount of time designing the semiconductor device.

In further detail, FIG. 1 is a flow chart illustrating an exemplary method 100 of fabricating a semiconductor device in accordance with various embodiments of the present disclosure. As will be described hereinafter, the method 100 employs one or more electronic design automation (EDA) tools that verify whether a layout of a semiconductor device complies with a predetermined specification before manufacturing/fabricating the semiconductor device.

Figure 2:
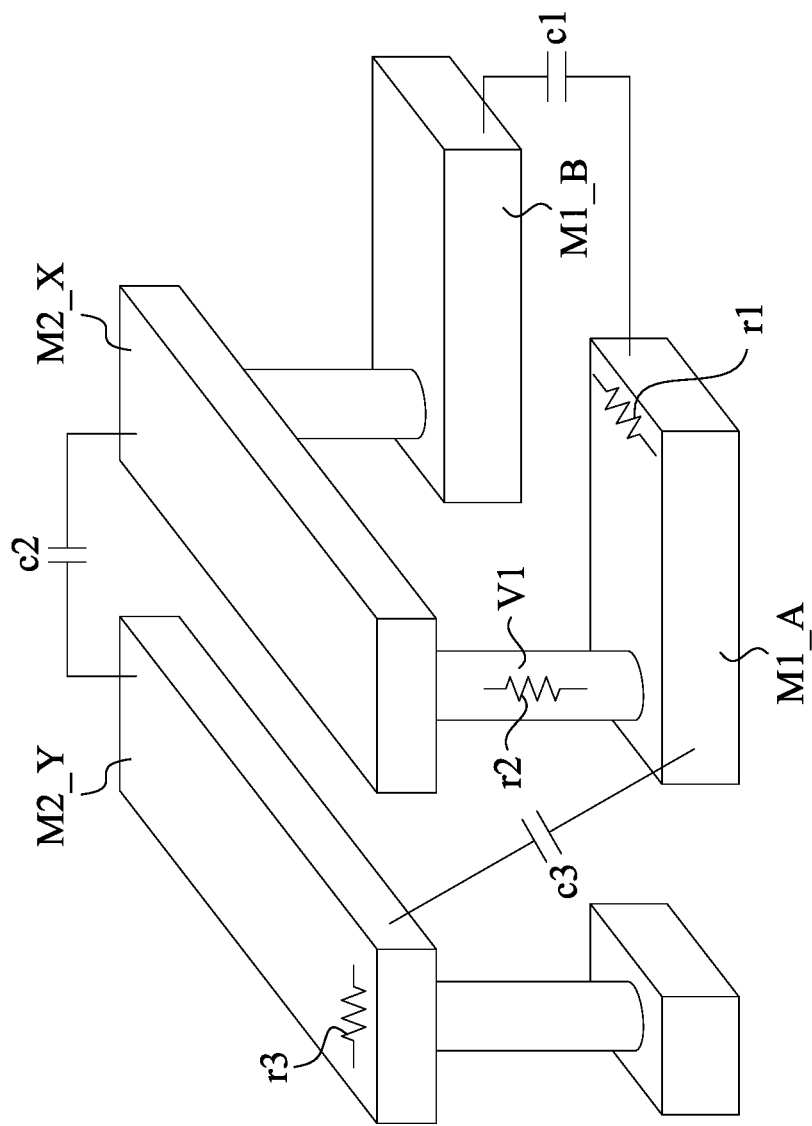
FIG. 2 is a partial perspective view illustrating an exemplary layout of a semiconductor device in accordance with various embodiments of the present disclosure.

In operation 110, a parasitic resistance and capacitance (RC) extraction tool receives a layout, e.g., layout 200 shown in FIG. 2, of a semiconductor device. In some embodiments, the layout 200 is generated in the form of a Graphic Design System (GDS) file. Other database file formats for describing the layout 200 are usable in other embodiments. FIG. 2 is a partial perspective view illustrating an exemplary layout 200 of a semiconductor device in accordance with various embodiments of the present disclosure. As illustrated in FIG. 2, the layout 200 includes elements such as conductive lines (M1_A, M1_B, M2_X, M2_Y) and a via (V1).

In certain embodiments, the layout 200 includes elements other than those shown in FIG. 2. For example, in such certain embodiments, the layout 200 further includes a substrate and a plurality of electronic components between the substrate and the M1 layer. Examples of substrates include, but are not limited to, bulk semiconductor substrates (e.g., Si, Ge, or the like), semiconductor-on-insulator (SOI) substrates, and compound semiconductor substrates (SiGe, GaAs, or the like).

The electronic components are connected by interconnects, e.g., interconnects (M1_A, M1_B, V1, M2_X, M2_Y), and may be active electronic components, passive electronic components, or a combination thereof. Examples of active electronic components include, but are not limited to, transistors (e.g., field effect transistors, bipolar junction transistors, high voltage transistors, high frequency transistors, or the like) and diodes. Examples of passive electronic components include, but are not limited to, resistors, capacitors, inductors, and fuses. Examples of interconnects include, but are not limited to, metal lines, e.g., metal lines (M1_A, M1_B, M2_X, M2_Y), vias, e.g., via (V1), through substrate vias (TSV), conductive pads, and conductive bumps.

Referring back to FIG. 1, after receiving the layout 200, in operation 120, the RC extraction tool performs an RC extraction to acquire parasitic values associated with the layout 200. For example, as illustrated in FIG. 2, the elements (M1_A, V1, M2_Y) may have parasitic resistances (r1-r3), respectively. The elements (M1_A, M1_B) may have a parasitic capacitance (c1) therebetween. A parasitic capacitance (c2) may occur between the elements (M2_X, M2_Y). The parasitic resistance (r1) of the element (M1_A) and the parasitic resistance (r3) of the element (M2_Y) may be connected by a parasitic capacitance (c3). Such parasitic values (r1-r3, c1-c3) are not intended by the semiconductor device designer but are intrinsic to the materials used in fabricating the elements (M1_A, M1_B, V1, M2_X, M2_Y), the sizes/shapes thereof, and the positions thereof relative to each other.

In this exemplary embodiment, the RC extraction tool extracts the parasitic values (r1-r3, c1-c3) from a technology file. A technology file includes a pre-built table that stores elements, such as elements (M1_A, M1_B, V1, M2_X, M2_Y), and their corresponding parasitic values. In one or more embodiments, the semiconductor device includes parasitic values other than those shown in FIG. 2. For example, in such one or more embodiments, each element (M1_A, M1_B, V1, M2_X, M2_Y) may have a plurality of parasitic resistances along the length thereof. Parasitic capacitances may appear between the element (M1_A, M1_B, V1, M2_X, M2_Y) and the ground.

The RC extraction tool then generates an RC netlist that includes the element names (M1_A, M1_B, V1, M2_X, M2_Y) and the extracted parasitic values (r1-r3, c1-c3). For example, the RC netlist includes an extracted parasitic values table shown in FIG. 3 and an element names table shown in FIG. 4. FIGS. 3 and 4 are diagrams illustrating an exemplary extracted parasitic values table and an exemplary element names table of the RC netlist, respectively, in accordance with various embodiments of the present disclosure. As illustrated in FIG. 3, the extracted parasitic values table of the RC netlist stores codenames and the extracted parasitic values. The codenames may not be human readable, i.e., intelligible to the semiconductor device designer. For example, the semiconductor device designer may not be able to identify which one of the elements (M1_A, M1_B, V1, M2_X, M2_Y) of the layout 200 has the parasitic resistance (r1-r3) based on the codename ($1vl1=1, $1vl2=2, $1vl3=3). Also, the semiconductor device designer may not be able to identify which two of the elements (M1_A, M1_B, V1, M2_X, M2_Y) of the layout 200 has the parasitic capacitance (c1-c3) therebetween based on the code name ($1vl4=4, $1vl5=5, $1vl6=6).

As illustrated in FIG. 4, the element names table of the RC netlist stores codenames and element names. While the codenames (*1-*6) may not be human readable, the element names (M1_A, V1, M2_Y, M1_A_M1_B, M2_X_M2_Y, M1_A_M2_Y) are intelligible to the semiconductor device designer. For example, the semiconductor device designer understands that the element names (M1_A, M1_B, V1, M2_X, M2_Y) of the RC netlist refers to the elements (M1_A, M1_B, V1, M2_X, M2_Y) of the layout 200, respectively.

Referring back to FIG. 1, in some embodiments, prior to operation 120, a layout-versus-schematic (LVS) check is performed by an LVS checking tool on the layout 200 to ensure that the layout 200 corresponds to a circuit diagram netlist. For example, the LVS checking tool recognizes the electrical components and the interconnects of the layout 200 and generates an LVS netlist. The LVS checking tool then compares the LVS netlist generated thereby with the circuit diagram netlist. If it is determined that the two netlists match, the layout 200 passes the LVS check. Otherwise, e.g., two electrical components that should be separated are connected by an interconnect, an interconnect that should be connected is left hanging, and/or an electrical component that should be present is absent, a correction is made to the layout 200.

In other embodiments, prior to operation 120, a design rule check (DRC) may be performed on the layout 200 to ensure that the layout 200 of the semiconductor device satisfies manufacturing design rules, i.e., confirming whether manufacturing/fabrication of the semiconductor device is feasible. If the layout 200 fails the DRC, i.e., one or more manufacturing design rules is violated, correction is made to the layout 200.

Figure 5:
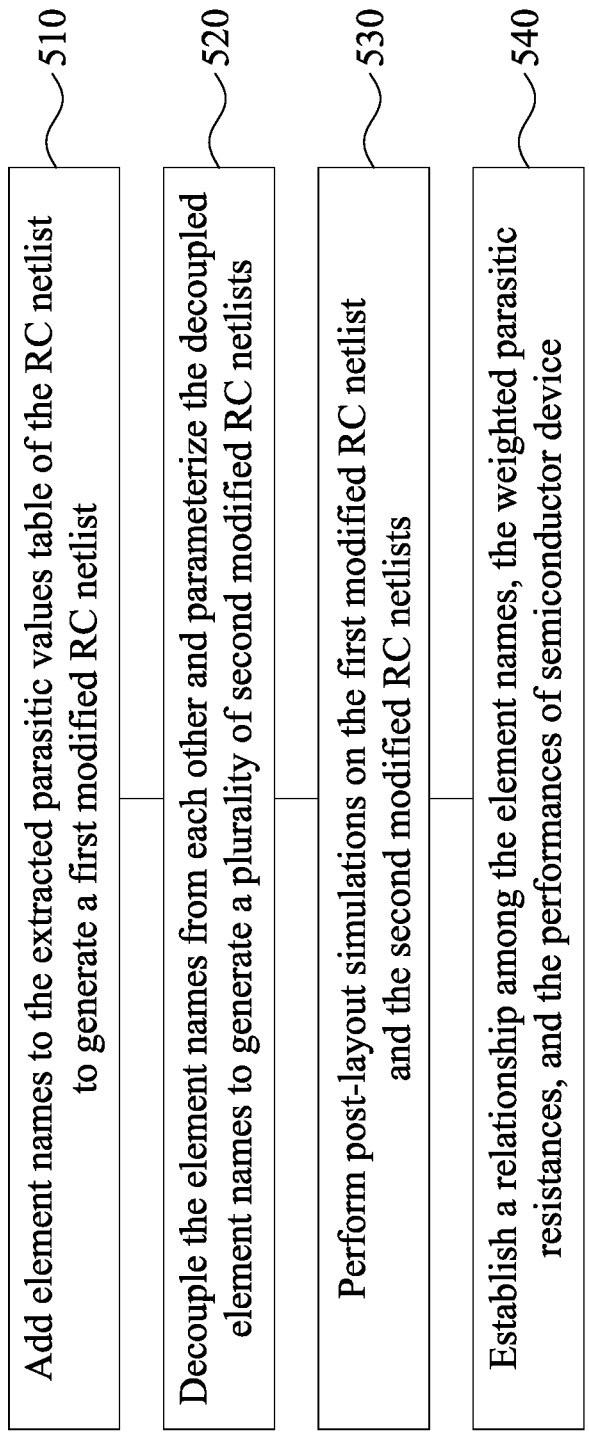
FIG. 5 is a flow chart illustrating an exemplary operation of a method in accordance with various embodiments of the present disclosure.

Referring back to FIG. 1, after extracting the parasitic values, in operation 130, a post-layout simulation tool performs a post-layout simulation on the RC netlist, taking into account the effect of the extracted parasitic values (r1-r3, c1-c3) on the performance of the semiconductor device. In some embodiments, the post-layout simulation is carried out using a Simulation Program with Integrated Circuit Emphasis (SPICE) tool. Other post-layout simulation tools, instead of or in addition to SPICE tool, are usable in other embodiments. FIG. 5 is a flow chart illustrating an exemplary operation 130 of the method 100 in accordance with various embodiments of the present disclosure. In operation 510, the post-layout simulation tool adds the element names, e.g., element names (M1_A, V1, M2_Y), of the element names table of the RC netlist to the extracted parasitic values table of the RC netlist to generate a first modified RC netlist, e.g., first modified RC netlist 600 shown in FIG. 6. FIG. 6 is a diagram illustrating an exemplary first modified RC netlist 600 in accordance with various embodiments of the present disclosure. As illustrated in FIG. 6, the first modified RC netlist 600 may include a netlist table that stores the elements names (M1_A, V1, M2_Y) and the extracted parasitic resistances (r1-r3). The first modified RC netlist 600 is human readable in the sense that the semiconductor device designer can deduce therefrom that the elements (M1_A, V1, M2_Y) of the layout 200 have the parasitic resistance (r1-r3), respectively, based on the element names (M1_A, V1, M2_Y). In this exemplary embodiment, as can be seen from FIG. 6, the extracted parasitic resistances (r1-r3) are weighted by a weighing factor (W), e.g., 1. Other weighing factors are usable in further embodiments.

In an alternative embodiment, instead of adding the element names of the element names table to the extracted parasitic values table, the post-layout simulation tool creates a new table derived from these two tables. In such an alternative embodiment, the new table stores the elements names (M1_A, V1, M2_Y), the extracted parasitic resistances (r1-r3), and the weighing factors (W).

Figure 7:
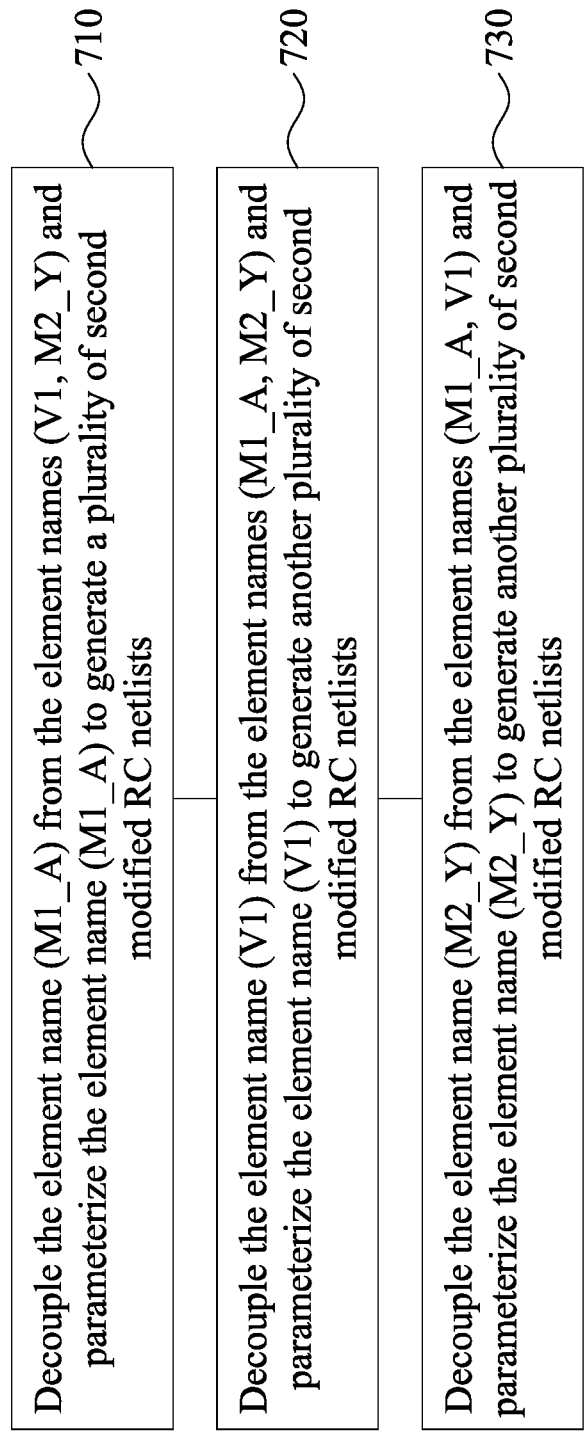
FIG. 7 is a flow chart illustrating another exemplary operation of a method in accordance with various embodiments of the present disclosure.

Referring back to FIG. 5, after generating the first modified RC netlist 600, in operation 520, the post-layout simulation tool decouples the element names of the first modified RC netlist 600 from each other and parameterizes the decoupled element names to generate a plurality of second modified RC netlists. For example, FIG. 7 is a flow chart illustrating an exemplary operation 520 of the method 100 in accordance with various embodiments of the present disclosure. In operation 710, the post-layout simulation tool decouples the element name (M1_A) from the element names (V1, M2_Y) and parameterizes the decoupled element name (M1_A) to generate a plurality of second modified RC netlists, e.g., second modified RC netlists shown in FIGS. 8A-8D. FIGS. 8A-8D are diagrams illustrating exemplary second modified RC netlists in accordance with various embodiments of the present disclosure. As illustrated in FIGS. 8A-8D, the second modified RC netlists of operation 710 vary the extracted parasitic resistance (r1) of the element name (M1_A), while maintaining the extracted parasitic resistance (r2, r3) of the element name (V1, M2_Y) constant. For example, in one or more embodiments, the parasitic resistance (r1) is multiplied by different weighing factors (W), e.g., 0.8, 0.9, 1.1, and 1.2 and the extracted parasitic resistance (r2, r3) is multiplied by a weighing factor of 1. Other weighing factors are usable in further embodiments. In such one or more embodiments, the element name (M1_A) in each second modified RC netlist have different parasitic resistances, e.g., 0.8r1, 0.9r1, 1.1r1, and 1.2r1, whereas the element name (V1, M2_Y) in each second modified RC netlist have the same parasitic resistance (r2, r3).

Referring back to FIG. 7, in operation 720, the post-layout simulation tool decouples the element name (V1) from the element names (M1_A, M2_Y) and parameterizes the decoupled element name (V1) to generate another plurality of second modified RC netlists. The second modified RC netlists of operation 720 vary the parasitic resistance (r2) of the element name (V1), while maintaining the parasitic resistance (r1, r3) of the element name (M1_A, M2_Y) constant. For example, in one or more embodiments, the parasitic resistance (r2) is multiplied by different weighing factors (W), e.g., 0.8, 0.9, 1.1, and 1.2 and the extracted parasitic resistance (r1, r3) is multiplied by a weighing factor of 1. Other weighing factors are usable in further embodiments. In such one or more embodiments, the element name (V1) in each second modified RC netlist have different parasitic resistances, e.g., 0.8r2, 0.9r2, 1.1r2, and 1.2r2, whereas the element name (M1_A, M2_Y) in each second modified RC netlist have the same parasitic resistance (r1, r3).

Next, in operation 730, the post-layout simulation tool decouples the element name (M2_Y) from the element names (M1_A, V1) and parameterizes the decoupled element name (M2_Y) to generate another plurality of second modified RC netlists. The second modified RC netlists of operation 730 vary the parasitic resistance (r3) of the element name (M2_Y), while maintaining the parasitic resistance (r1, r2) of the element name (M1_A, V1) constant. For example, in one or more embodiments, the parasitic resistance (r3) is multiplied by different weighing factors (W), e.g., 0.8, 0.9, 1.1, and 1.2 and the extracted parasitic resistance (r1, r2) is multiplied by a weighing factor of 1. Other weighing factors are usable in further embodiments. In such one or more embodiments, the element name (M2_Y) in each second modified RC netlist have different parasitic resistances, e.g., 0.8r3, 0.9r3, 1.1r3, and 1.2r3, whereas the element name (M1_A, V1) in each second modified RC netlist have the same parasitic resistance (r1, r2).

Referring back to FIG. 5, after generating the second modified RC netlists, in operation 530, the post-layout simulation tool performs post-layout simulations on the first modified RC netlist 600 generated in operation 510 and the second modified RC netlists generated in operations 710, 720, and 730 and outputs a plurality of post-layout simulation results. Thereafter, in operation 540, a relationship among the element names (M1_A, V1, M2_Y), the weighted extracted parasitic resistances (0.8×, 0.9×, 1×, 1.1×, 1.1×), and the performances of the semiconductor device is established based on the post-layout simulation results. Such a relationship may be described in the form of a table, e.g., performance table shown in FIG. 9, or a graph, e.g., performance graph shown in FIG. 10. Such a performance table/graph allows the semiconductor device designer to conduct a sensitivity analysis on how sensitive the performance of the semiconductor device to the parasitic resistances (r1-r3) of the elements (M1_A, V1, M2_Y), respectively, as will be described below.

Referring back to FIG. 1, after performing the post-layout simulation, in operation 140, if the post-layout simulation result indicates that the layout 200 does not meet the predetermined specification, e.g., the extracted parasitic resistances (r1-r3) may be detrimental to the performance of the semiconductor device, the flow proceeds to operation 150. Otherwise, i.e., the layout 200 meets the predetermined specification, the flow proceeds to operation 160. In operation 150, the layout 200 is optimized through one or more iterations. For example, FIG. 9 is a diagram illustrating an exemplary performance table 900 in accordance with various embodiments of the present disclosure. As illustrated in FIG. 9, the performance table 900 stores the element names (M1_A, V1, M2_Y), the weighted extracted parasitic resistances (0.8×, 0.9×, 1×, 1.1×, 1.2×), and the performances of the semiconductor device. For example, the 0% is the percentage added to the performance of the semiconductor device when the weighted extracted parasitic resistance of the element name (M1_A) is 1×. The +1.5% and +0.8% are the percentages added to the performances of the semiconductor device when the weighted extracted parasitic resistances of the element (M1_A) are 0.8× and 0.9×, respectively. The −0.5% and −1.0% are the percentages deducted from the performances of the semiconductor device when the weighted extracted parasitic resistances of the element (M1_A) are 1.1× and 1.2×, respectively.

Figure 10:
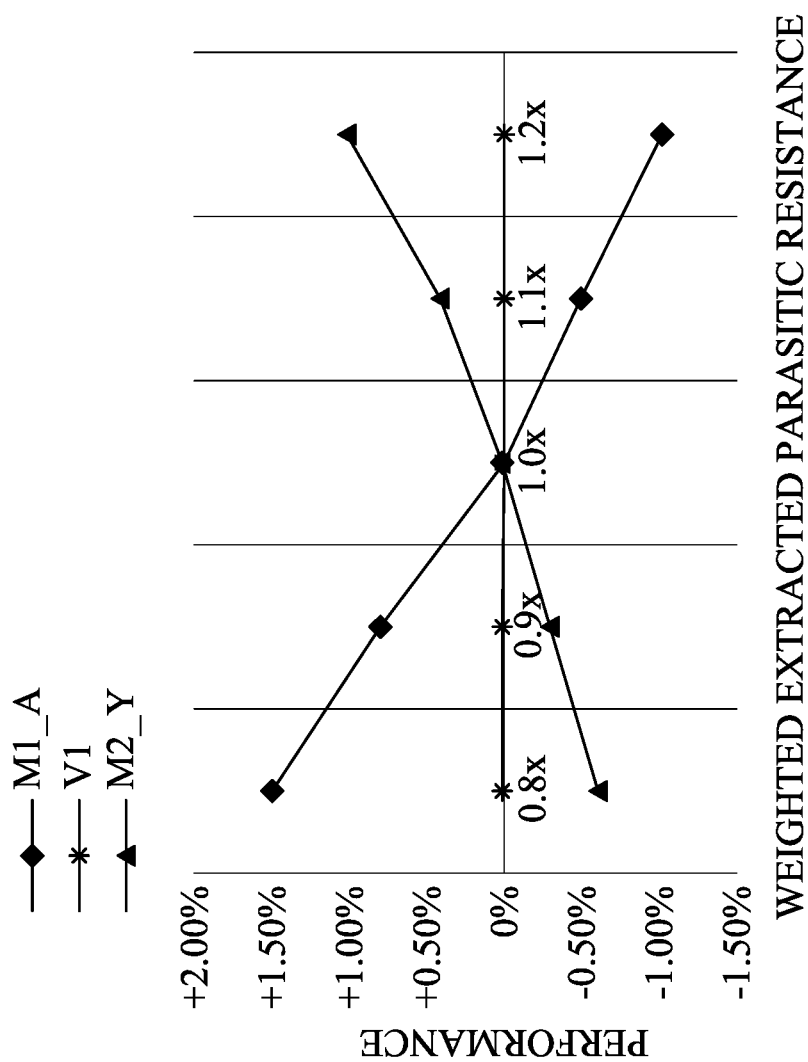
FIG. 10 is a diagram illustrating an exemplary performance graph in accordance with various embodiments of the present disclosure.

As can be seen from the performance table 900, with further reference to FIG. 10, which is a diagram illustrating an exemplary performance graph 1000 in accordance with various embodiments of the present disclosure, the performance of the semiconductor device is sensitive to the parasitic resistance (r1) of the element (M1_A), is less sensitive to the parasitic resistance (r2) of the element (V1), and is substantially insensitive to the parasitic resistance (r3) of the element (M2_Y). For example, the lower the parasitic resistance (r1), the better the performance of the semiconductor device. Conversely, the higher the parasitic resistance (r2), the better the performance of the semiconductor device. The parasitic resistance (r3) has substantially no effect on the performance of the semiconductor device. As such, the semiconductor device designer may optimize the layout 200, e.g., by increasing the width of the element (M1_A) and by decreasing the width of the element (V1).

Referring back to FIG. 1, in operation 160, additional verification operations are performed on the layout 200. Next, in operation 170, it is determined whether the layout 200 passes or fails the verification. When it is determined that the layout 200 passes the verification, in operation 180, the semiconductor device is fabricated based on the layout 200. Otherwise, i.e., it is determined that the layout 200 fails the verification and, in operation 150, correction is made to the layout 200.

Figure 11:
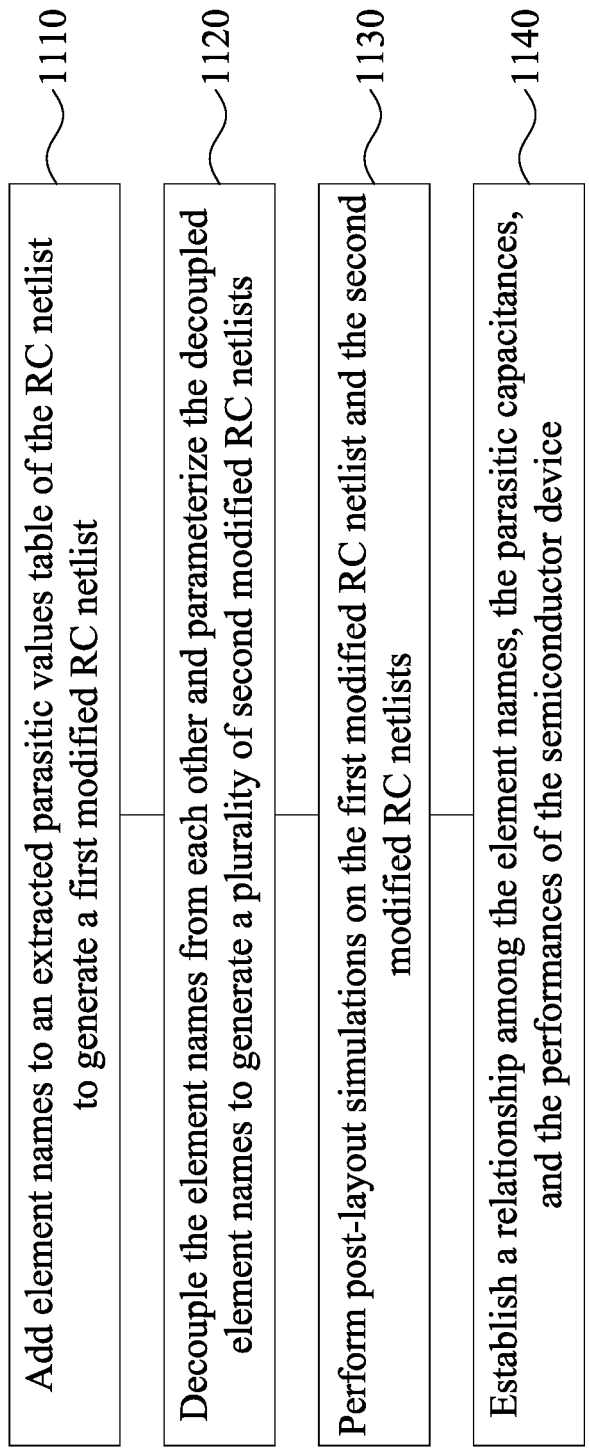
FIG. 11 is a flow chart illustrating another exemplary operation of a method in accordance with various embodiments of the present disclosure.

FIG. 11 is a flow chart illustrating another exemplary operation 130 of the method 100 in accordance with various embodiments of the present disclosure. In operation 1110, the post-layout simulation tool adds the elements names, e.g., the element names (M1_A_M1_B, M2_X_M2_Y, M1_A_M2_Y), of the element names table of the RC netlist to the extracted parasitic RC table values table of the RC netlist to generate a first modified RC netlist, e.g., first modified RC netlist 1200 shown in FIG. 12. FIG. 12 is a diagram illustrating an exemplary first modified RC netlist 1200 in accordance with various embodiments of the present disclosure. As illustrated in FIG. 12, the first modified RC netlist 1200 may include a netlist table that stores the element names (M1_A_M1_B, M2 X_M2_Y, M1_A_M2_Y) and the extracted parasitic capacitances (c1-c3). The first modified RC netlist 120 is human readable in the sense that the semiconductor device designer can deduce therefrom that the parasitic capacitances (c1-c3) are between the elements (M1_A, M1_B), between the elements (M2_X, M2_Y), and between the elements (M1_A, M2_Y), respectively, based on the element names (M1_A_M1_B, M2_X_M2_Y, M1_A_M2_Y). In this exemplary embodiment, as can be seen from FIG. 12, the extracted parasitic capacitances (c1-c3) are weighted by a weighing factor (W), e.g., 1. Other weighing factors are usable in further embodiments.

In an alternative embodiment, instead of adding the element names of the element names table to the extracted parasitic values table, the post-layout simulation tool creates a new table derived from these two tables. In such an alternative embodiment, the new table stores the elements names (M1_A_M1_B, M2_X_M2_Y, M1_A_M2_Y), the parasitic capacitances (c1-c3), and the weighing factors (W).

Figure 13:
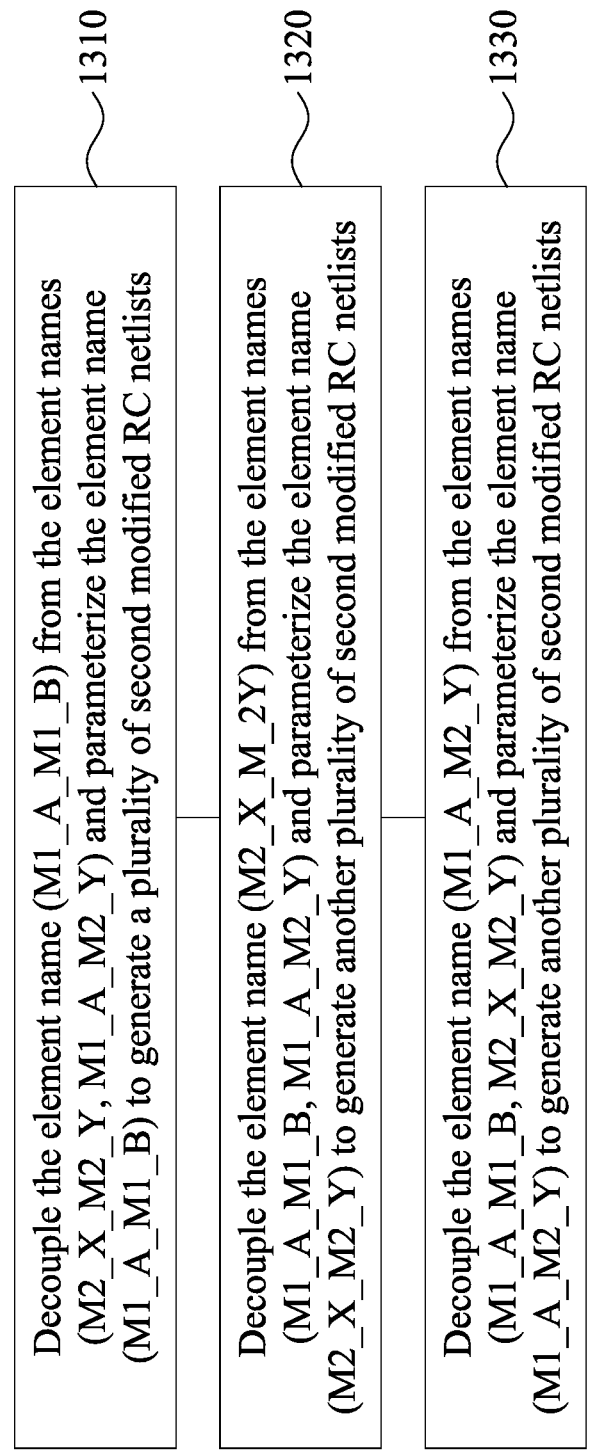
FIG. 13 is a flow chart illustrating another exemplary operation of a method in accordance with various embodiments of the present disclosure.

Referring back to FIG. 11, after generating the first modified RC netlist 1200, in operation 1120, the post-layout simulation tool decouples the element names of the first modified RC netlist 1200 from each other and parameterizes the decoupled element names to generate a plurality of second modified RC netlists. For example, FIG. 13 is a flow chart illustrating an exemplary operation 1120 of the method 100 in accordance with various embodiments of the present disclosure. In operation 1310, the post-layout simulation tool decouples the element name (M1_A_M1_B) from the element names (M2_X_M2_Y, M1_A_M2_Y) and parameterizes the decoupled element name (M1_A_M1_B) to generate a plurality of second modified RC netlists, e.g., second modified RC netlists shown in FIGS. 14A-14D. FIGS. 14A-14D are diagrams illustrating another exemplary second modified RC netlists in accordance with various embodiments of the present disclosure. As illustrated in FIGS. 14A-14D, the second modified RC netlists of operation 1310 vary the extracted parasitic capacitance (c1) of the element name (M1_A_M1_B), while maintaining the extracted parasitic capacitance (c2, c3) of the element name (M2_X_M2_Y, M1_A M2_Y) constant. For example, in one or more embodiments, the extracted parasitic capacitance (c1) is multiplied by different weighing factors (W), e.g., 0.8, 0.9, 1.1, and 1.2 and the extracted parasitic capacitance (c2, c3) is multiplied by a weighing factor of 1. Other weighing factors are usable in further embodiments. In such one or more embodiments, the element name (M1_A_M1_B) in each second modified RC netlist have different parasitic capacitances, e.g., 0.8c1, 0.9c1, 1.1c1, and 1.2c1, whereas the element name (M2_X_M2_Y, M1_A_M2_Y) in each second modified RC netlist have the same parasitic capacitance (c2, c3).

Referring back to FIG. 13, in operation 1320, the post-layout simulation tool decouples the element name (M2_X_M2_Y) from the element names (M1_A_M1_B, M1_A_M2_Y) and parameterizes the decoupled element name (M2_X_M2_Y) to generate another plurality of second modified RC netlists. The second modified RC netlists operation 1320 vary the extracted parasitic capacitance (c2) of the element name (M2_X_M2_Y), while maintaining the extracted parasitic capacitance (c1, c3) of the element name (M1_A_M1_B, M1_A_M2_Y) constant. For example, in one or more embodiments, the extracted parasitic capacitance (c2) is multiplied by different weighing factors (W), e.g., 0.8, 0.9, 1.1, and 1.2 and the parasitic capacitance (c1, c3) is multiplied by a weighing factor of 1. Other weighing factors are usable in further embodiments. In such one or more embodiments, the element name (M2_X_M2_Y) in each second modified RC netlist have different parasitic capacitances, e.g., 0.8c2, 0.9c2, 1.1c2, and 1.2c2, whereas the element name (M1_A_M1_B, M1_A_M2_Y) in each second modified RC netlist have the same parasitic capacitance (c1, c3).

Next, in operation 1330, the post-layout simulation tool decouples the element name (M1_A_M2_Y) from the element names (M1_A_M1_B, M2_X_M2_Y) and parameterizes the decoupled element name (M1_A_M2_Y) to generate another plurality of second modified RC netlists. The second modified RC netlists of operation 1330 vary the extracted parasitic capacitance (c3) of the element name (M1_A_M2_Y), while maintaining the extracted parasitic capacitance (c1, c2) of the element name (M1_A_M1_B, M2_X_M2_Y) constant. For example, in one or more embodiments, the parasitic capacitance (c3) is multiplied by different weighing factors (W), e.g., 0.8, 0.9, 1.1, and 1.2 and the parasitic capacitance (c1, c2) is multiplied by a weighing factor of 1. Other weighing factors are usable in further embodiments. In such one or more embodiments, the element name (M1_A_M2_Y) in each second modified RC netlist have different parasitic capacitances, e.g., 0.8c3, 0.9c3, 1.1c3, and 1.2c3, whereas the element name (M1_A_M1_B, M2_X_M2_Y,) in each second modified RC netlist have the same parasitic capacitance (c1, c2).

Referring back to FIG. 11, after generating the second modified RC netlists, in operation 1130, the post-layout simulation tool performs post-layout simulations on the first modified RC netlist generated in operation 1110 and the second modified RC netlists generated in operations 1310, 1320, and 1330 and outputs a plurality of post-layout simulation results. Thereafter, in operation 1140, a relationship among the element names (M1_A_M1_B, M2_X_M2_Y, M1_A_M2_Y), the weighted extracted parasitic capacitances (0.8×, 0.9×, 1×, 1.1×, 1.1×), and the performances of the semiconductor device is established based on the post-layout simulation results. Such a relationship may be described in the form of a table, e.g., performance table shown in FIG. 15, or a graph, e.g., performance graph shown in FIG. 16. Such a performance table and/or graph allows the semiconductor device designer to conduct a sensitivity analysis on how sensitive the performance of the semiconductor device to the parasitic capacitances (c1-c3) between the elements (M1_A, M1_B), between the elements (M2_X, M2_Y), and between the elements (M1_A, M2_Y), as will be described below.

Referring back to FIG. 1, after performing the post-layout simulation, in operation 140, if the post-layout simulation result indicates that the layout 200 does not meet the predetermined specification, e.g., the extracted parasitic capacitances (c1-c3) may be detrimental to the performance of the semiconductor device, the flow proceeds to operation 150. Otherwise, i.e., the layout 200 meets the predetermined specification, the flow proceeds to operation 160. In operation 150, the layout 200 is optimized through one or more iterations. For example, FIG. 15 is a diagram illustrating an exemplary performance table 1500 in accordance with various embodiments of the present disclosure. As illustrated in FIG. 15, the performance table 1500 stores the element names (M1_A_M1_B, M2_X_M2_Y, M1_A_M2_Y), the weighted extracted parasitic capacitances (0.8×, 0.9×, 1×, 1.1×, 1.2×), and the performances of the semiconductor device. For example, the 0% is the percentage added to the performance of the semiconductor device when the weighted extracted parasitic capacitance of the element name (M1_A_M1_B) is 1×. The +1.80% and +1.00% are the percentages added to the performances of the semiconductor device when the weighted extracted parasitic capacitances of the element name (M1_A_M1_B) are 0.8× and 0.9×, respectively. The −0.80% and −1.50% are the percentages deducted from the performances of the semiconductor device when the weighted extracted parasitic capacitances of the element (M1_A_M1_B) are 1.1× and 1.2×, respectively.

Figure 16:
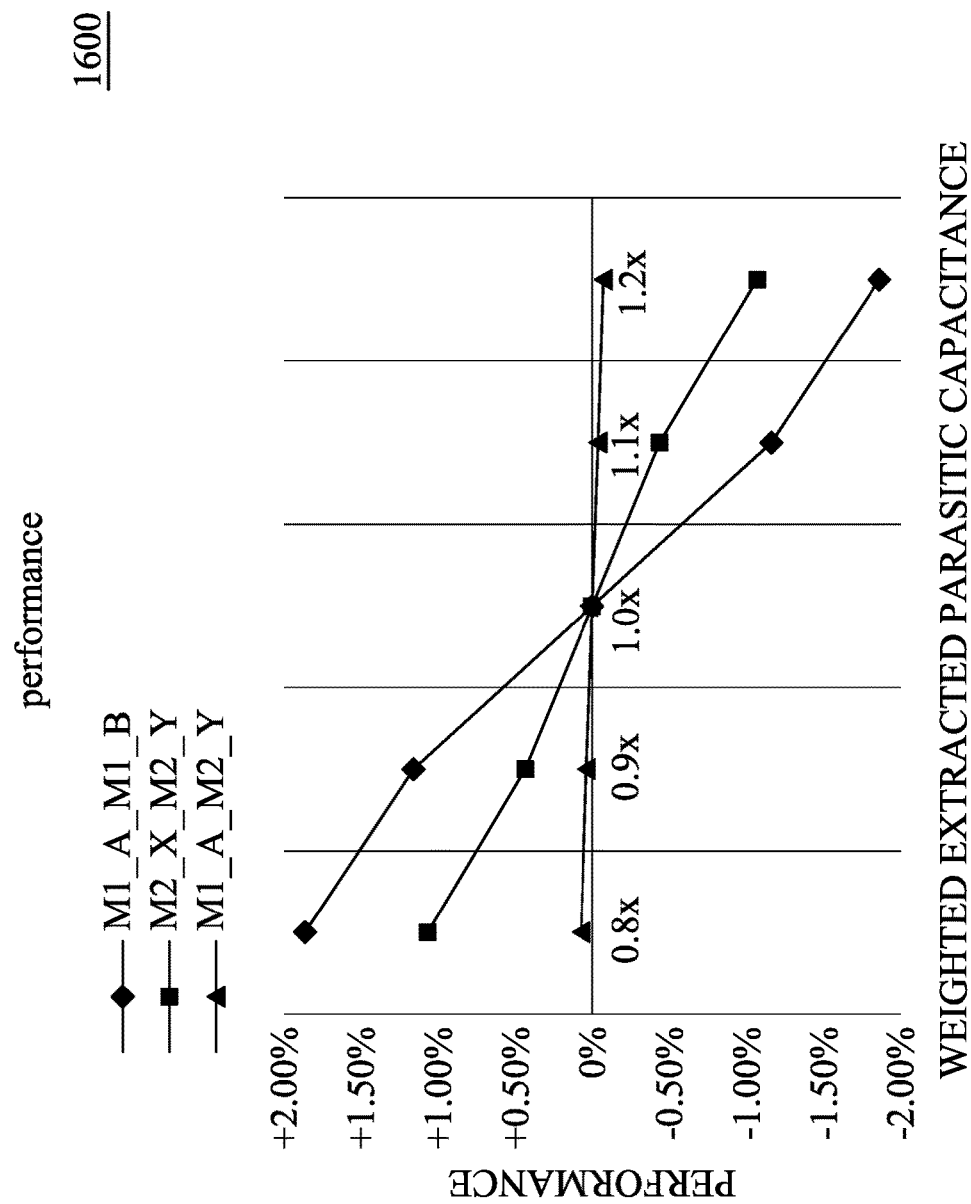
FIG. 16 is a diagram illustrating another exemplary performance graph in accordance with various embodiments of the present disclosure.

As can be seen from the performance table 1500, with further reference to FIG. 16, which is a diagram illustrating an exemplary performance graph 1600 in accordance with various embodiments of the present disclosure, the performance of the semiconductor device is more sensitive to the parasitic capacitance (c1) between the elements (M1_A, M1_B), is less sensitive to the parasitic capacitance (c2) between the elements (M2_X, M2_Y), and is substantially insensitive to the parasitic capacitance (c3) between the elements (M1_A, M2_Y). For example, the lower the parasitic capacitance (c1), the better the performance of the semiconductor device. Likewise, the lower the parasitic capacitance (c2), the better the performance of the semiconductor device. The parasitic capacitance (c3) has substantially no effect on the performance of the semiconductor device. As such, the semiconductor device designer may optimize the layout 200, e.g., by increasing the distances between the elements (M1_A, M1_B) and between the elements (M2_X, M2_Y).

Referring back to FIG. 1, in operation 160, additional verification operations are performed on the layout 200. Then, in operation 170, it is determined whether the layout 200 passes or fails the verification. When it is determined that the layout 200 passes the verification, in operation 180, the semiconductor device is fabricated based on the layout 200. Otherwise, i.e., it is determined that the layout 200 fails the verification and, in operation 150, correction is made to the layout 200.

Figure 17:
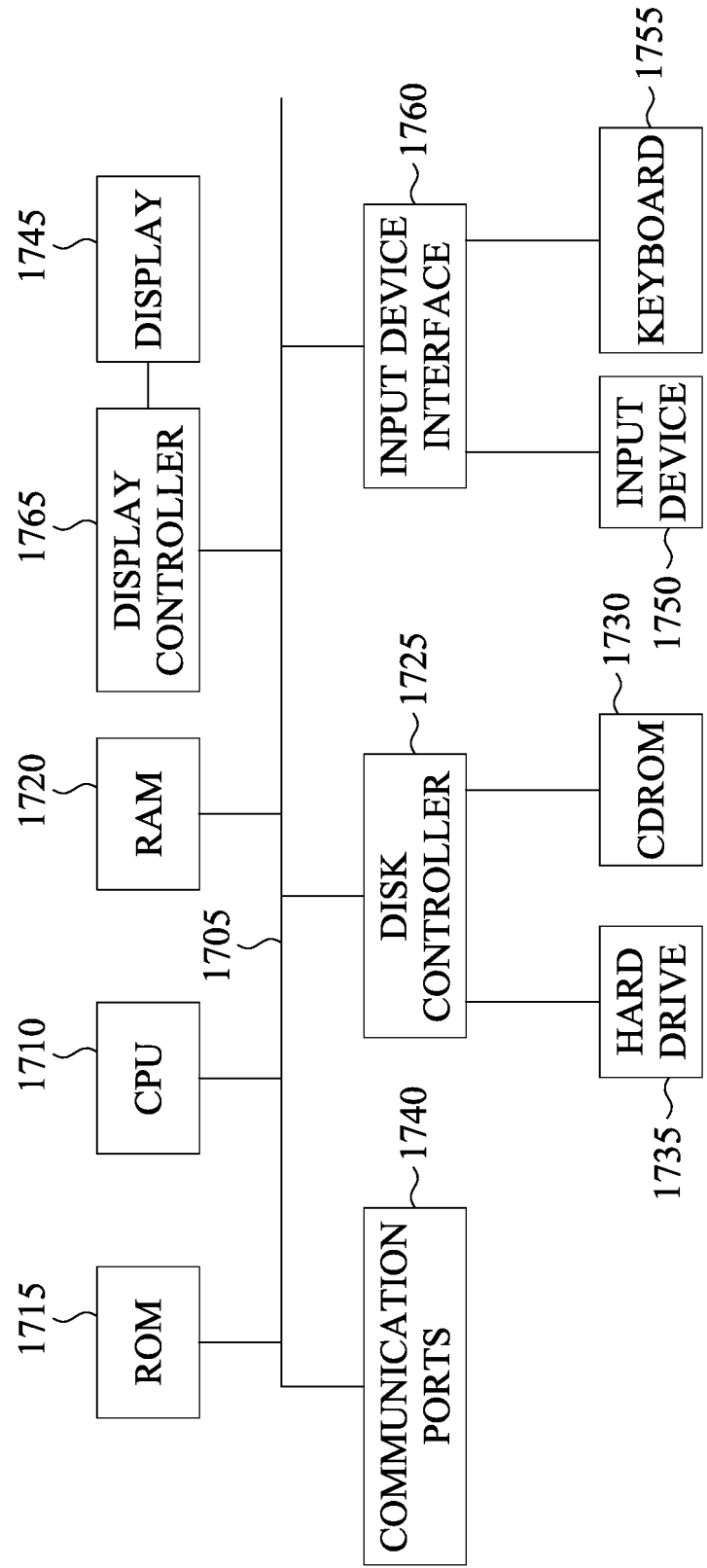
FIG. 17 is a block diagram illustrating an exemplary computing device architecture in accordance with various embodiments of the present disclosure.

FIG. 17 is a block diagram illustrating an exemplary computing device architecture 1700 in accordance with various embodiments of the present disclosure. A bus 1705 can serve as the information highway interconnecting the other illustrated components of the hardware. A processing system 1710 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1715 and random access memory (RAM) 1720, can be in communication with the processing system 1710 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1725 can interface one or more optional disk drives to the system bus 1705. These disk drives can be external or internal CD-ROM, CD-R, CD-RW or DVD, or solid state drives such as 1730, or external or internal hard drives 1735. As indicated previously, these various disk drives 1730, 1735 and disk controllers 1725 are optional devices. The system bus 1705 can also include at least one communication port 1740 to allow for communication with external devices either physically connected to the computing system or available externally through a wired or wireless network. In some cases, the communication port 1740 includes or otherwise comprises a network interface.

To provide for interaction with a user, the subject matter described herein can be implemented on a computing device having a display device 1745 (e.g., a CRT (cathode ray tube) or LCD (liquid crystal display) monitor) for displaying information obtained from the bus 1705 to the user and an input device 1750 such as keyboard 1755 and/or a pointing device (e.g., a mouse or a trackball) and/or a touchscreen by which the user can provide input to the computer. Other kinds of input devices 1750 can be used to provide for interaction with a user as well; for example, feedback provided to the user can be any form of sensory feedback (e.g., visual feedback, auditory feedback by way of a microphone or tactile feedback); and input from the user can be received in any form, including acoustic, speech, or tactile input. In the input device 1750 and the keyboard 1755 can be coupled to and convey information via the bus 1705 by way of an input device interface 1760. Other computing devices, such as dedicated servers, can omit one or more of the display 940 and display controller 1765, the input device 1750, the keyboard 1760, and input device interface 1760.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, Perl, Python, Tcls, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

In an embodiment, a system for fabricating a semiconductor device comprises one or more data processors configured to perform operations commanded by instructions stored in a non-transitory computer-readable medium. The instructions comprise receiving a layout including a plurality of elements, extracting parasitic values associated with the layout to generate a resistance and capacitance (RC) netlist, generating a modified RC netlist by adding element names of the elements of the layout to the RC netlist, performing a post-layout simulation on the modified RC netlist to determine whether the layout meets a predetermined specification, and fabricating a semiconductor device based on the layout when it is determined that the layout meets the predetermined specification. The RC netlist includes the extracted parasitic values. The modified RC netlist includes a netlist table storing the element names and the extracted parasitic values. In another embodiment, a method of fabricating a semiconductor device comprises receiving a layout including a plurality of elements, extracting parasitic values associated with the layout to generate a resistance and capacitance (RC) netlist, generating a modified RC netlist by adding element names of the elements of the layout to the RC netlist, performing a post-layout simulation on the modified RC netlist to determine whether the layout meets a predetermined specification, and fabricating a semiconductor device based on the layout when it is determined that the layout meets the predetermined specification. The RC netlist includes the extracted parasitic values. The modified RC netlist includes a netlist table storing the element names and the extracted parasitic values.

In another embodiment, a non-transitory computer-readable medium containing instructions therein which, when executed by a computer, cause the computer to receive a layout including a plurality of elements, extract parasitic values associated with the layout to generate a resistance and capacitance (RC) netlist, generate a modified RC netlist by adding element names of the elements of the layout to the RC netlist, perform a post-layout simulation on the modified RC netlist to determine whether the layout meets a predetermined specification, and fabricate a semiconductor device based on the layout when it is determined that the layout meets the predetermined specification. The RC netlist includes the extracted parasitic values. The modified RC netlist includes a netlist table storing the element names and the extracted parasitic values.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for fabricating a semiconductor device, comprising:
one or more data processors configured to perform operations commanded by instructions stored in a non-transitory computer-readable medium, the instructions comprising:
receiving a layout including a plurality of elements;
extracting parasitic values associated with the layout to generate a resistance and capacitance (RC) netlist, the RC netlist including the extracted parasitic values;
generating a first modified RC netlist by adding element names of the elements of the layout to the RC netlist, the first modified RC netlist including a netlist table storing the element names and the extracted parasitic values;
adjusting the extracted parasitic value using different weighing factors to obtain different changes in performance of the semiconductor device for the extracted parasitic value;
performing a post-layout simulation on the first modified RC netlist to determine whether the layout meets a predetermined specification; and
fabricating a semiconductor device based on the layout when it is determined that the layout meets the predetermined specification.

2. The system of claim 1, the instructions further comprising obtaining the element names from the RC netlist.

3. The system of claim 1, the instructions further comprising generating a plurality of second modified RC netlists based on the first modified RC netlist, wherein the second modified RC netlists vary the extracted parasitic value of a first element name of the element names while maintaining the extracted parasitic value of a second element name of the element names constant.

4. The system of claim 3, the instructions further comprising multiplying the extracted parasitic value of the first element name by the weighing factors.

5. The system of claim 4, the instructions further comprising:
performing a plurality of post-layout simulations on the first modified RC netlist and the second modified RC netlists to output a plurality of post-layout simulation results; and
establishing a relationship among the first element name, the weighted extracted parasitic values, and the changes in performances of the semiconductor device based on the post-layout simulation results.

6. The system of claim 5, wherein establishing the relationship creates a table that stores the first element name, the weighted extracted parasitic values, and the changes in performances of the semiconductor device.

7. The system of claim 5, wherein establishing the relationship creates a graph.

8. A method for fabricating a semiconductor device, the method comprising:
receiving a layout including a plurality of elements;
extracting parasitic values associated with the layout to generate a resistance and capacitance (RC) netlist, the RC netlist including the extracted parasitic values;
generating a first modified RC netlist by adding element names of the elements of the layout to the RC netlist, the first modified RC netlist including a netlist table storing the element names and the extracted parasitic values;
adjusting the extracted parasitic value using different weighing factors to obtain different changes in performance of the semiconductor device for the extracted parasitic value;
performing a post-layout simulation on the first modified RC netlist to determine whether the layout meets a predetermined specification; and
fabricating a semiconductor device based on the layout when it is determined that the layout meets the predetermined specification.

9. The method of claim 8, further comprising obtaining the element names from the RC netlist.

10. The method of claim 8, further comprising generating a plurality of second modified RC netlists based on the first modified RC netlist, wherein the second modified RC netlists vary the extracted parasitic value of a first element name of the element names while maintaining the extracted parasitic value of a second element name of the element names constant.

11. The method of claim 10, further comprising multiplying the extracted parasitic value of the first element name by the weighing factors.

12. The method of claim 11, further comprising:
performing a plurality of post-layout simulations on the first modified RC netlist and the second modified RC netlists to output a plurality of post-layout simulation results; and
establishing a relationship among the first element name, the weighted extracted parasitic values, and the changes in performances of the semiconductor device based on the post-layout simulation results.

13. The method of claim 12, wherein establishing the relationship creates a table that stores the first element name, the weighted extracted parasitic values, and the changes in performances of the semiconductor device.

14. The method of claim 12, wherein establishing the relationship creates a graph.

15. A non-transitory computer-readable medium containing instructions therein which, when executed by a computer, cause the computer to:
- receive a layout including a plurality of elements;
- extract parasitic values associated with the layout to generate a resistance and capacitance (RC) netlist, the RC netlist including the extracted parasitic values;
- generate a first modified RC netlist by adding element names of the elements of the layout to the RC netlist, the first modified RC netlist including a netlist table storing the element names and the extracted parasitic values;
- adjusting the extracted parasitic value using different weighing factors to obtain different changes in performance of the semiconductor device for the extracted parasitic value;
- perform a post-layout simulation on the first modified RC netlist to determine whether the layout meets a predetermined specification; and
- fabricate a semiconductor device when it is determined that the layout meets the predetermined specification.

16. The non-transitory computer-readable medium of claim 15, wherein the computer is further caused to generate a plurality of second modified RC netlists based on the first modified RC netlist, wherein the second modified RC netlists vary the extracted parasitic value of a first element name of the element names while maintaining the extracted parasitic value of a second element name of the element names constant.

17. The non-transitory computer-readable medium of claim 16, wherein
the computer is further caused to multiply the extracted parasitic value of the first element name by the weighing factors.

18. The non-transitory computer-readable medium of claim 17, wherein the computer is further caused to:
- perform a plurality of post-layout simulations on the first modified RC netlist and the second modified RC netlists to output a plurality of post-layout simulation results; and
- establish a relationship among the first element name, the weighted extracted parasitic values of the first element name, and the changes in performances of the semiconductor device based on the post-layout simulation results.

19. The non-transitory computer-readable medium of claim 18, wherein establishing the relationship includes creating a table that stores the first element name, the weighted extracted parasitic values, and the changes in performances of the semiconductor device.

20. The non-transitory computer-readable medium of claim 18, wherein establishing the relationship includes creating a graph.

* * * * *